Sept. 4, 1923.  1,466,741
J. F. O'CONNOR
FRICTION SHOCK ABSORBING MECHANISM
Filed Oct. 17, 1921  2 Sheets-Sheet 1
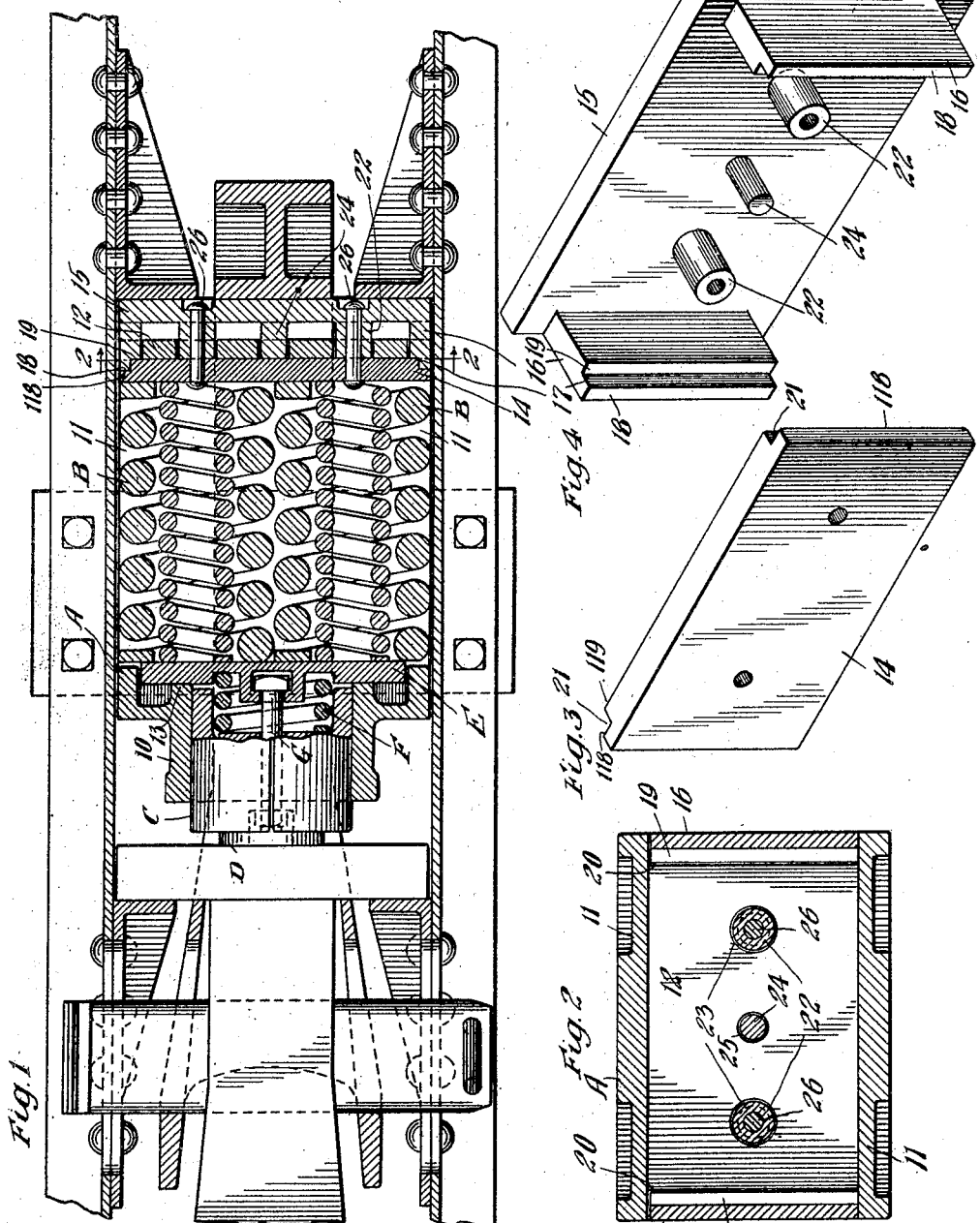
Witnesses
Wm. Geiger
Inventor
John F. O'Connor
By Geo. I. Haight
His Atty Sept. 4, 1923.
J. F. O'CONNOR
1,466,741
FRICTION SHOCK ABSORBING MECHANISM
Filed Oct. 17, 1921     2 Sheets-Sheet 2
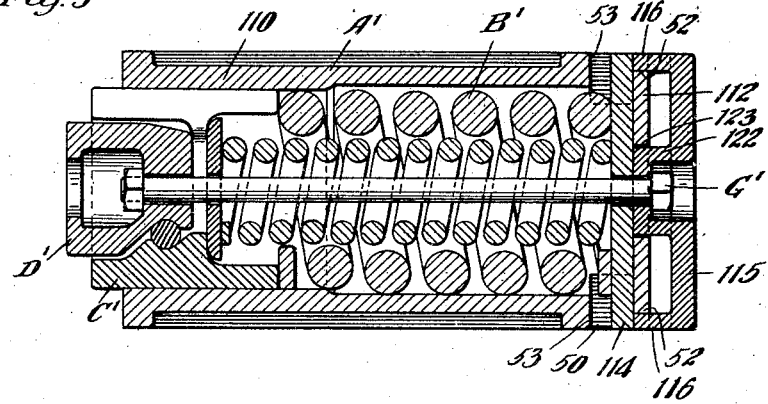
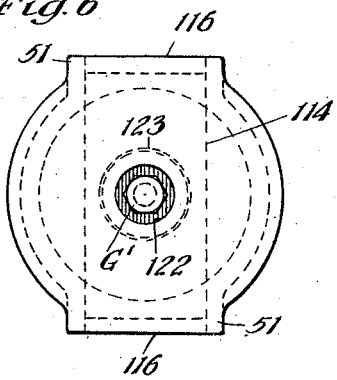
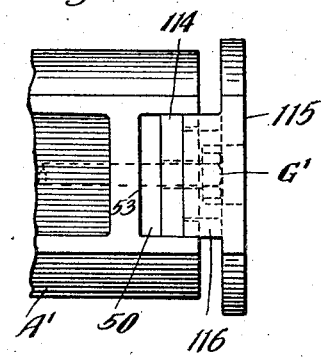
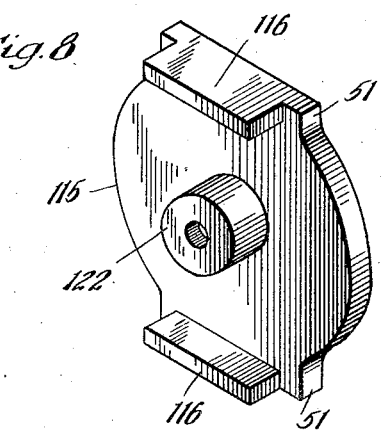
Witnesses
Wm. Geiger
Inventor
John F. O'Connor
By Geo. I. Haight
His Atty.

Patented Sept. 4, 1923.

1,466,741

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 17, 1921. Serial No. 508,337.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism for railway draft riggings having a preliminary spring action, the parts being so arranged that the main spring resistance for the friction elements is utilized to also provide the preliminary spring resistance to thereby eliminate the use of a separate preliminary spring.

A more specific object of the invention is to provide a friction shock absorbing mechanism employing a friction shell having a follower-acting wall with which is associated a preliminary spring follower in such a way as to avoid materially weakening the wall of the shell.

In the drawings forming a part of this specification, Figure 1 is a longitudinal horizontal sectional view of a portion of a railway draft rigging showing my improvements in connection therewith. Fig. 2 is a vertical transverse sectional view corresponding to the line 2—2 of Fig. 1. Figs. 3 and 4 are detail perspectives of two of the parts employed to make the preliminary spring follower. Fig. 5 is a longitudinal sectional view of another type of friction shock absorbing mechanism showing my invention embodied therein. Figs. 6 and 7 are end and plan elevational views of the construction shown in Fig. 5. And Fig. 8 is a detail perspective of one of the plates employed as a part of the preliminary spring follower in the construction illustrated in Fig. 5.

Referring first to the construction illustrated in Figs. 1 to 4 inclusive, the arrangement of draft sills, stop lugs, draw bar, yoke, front follower and coupler key are of standard or well-known form and need not be detailed. The improved shock absorbing mechanism proper, as shown, comprises a casting A; twin springs B—B; a plurality of friction shoes C—C; a wedge D; a front spring follower E; a light spring F; a retainer bolt G; and a preliminary spring follower at the rear end of the casting A, as more particularly described hereinafter.

The casting A is of that type having a cylindrical friction shell proper 10 at the forward end and rearwardly thereof, a rectangular spring cage or casing defined by the upper and lower walls 11—11 and rear transversely extending wall 12. The friction elements C and D are of well-known form, the same consisting of a plurality of friction-shoes in a circular series and a central wedge, respectively. The spring follower E engages normally against the shoulders defined at 13 at the inner end of the shell proper 10 and the friction elements are held in assembled relation by extending the retainer bolt G from said follower E to the wedge D. The spring F is of relatively light capacity under an initial compression to maintain the friction elements always snug and to compensate for wear.

The preliminary spring follower arrangement is as follows. On the inside of the wall 12 is disposed a plate 14 and on the outside another plate 15, both of rectangular outline and of a length corresponding to the dimension transversely of the casting A. The width of the plate 14, that is, vertically, corresponds to the vertical distance between the walls 11—11 whereas the width of the plate 15 corresponds to the overall height of the casting A. The plate 15 is provided at each end thereof with a forwardly extended flange 16, each of the latter being recessed on its inner side at the free edge as indicated at 17 to thereby provide stepped shoulders 18 and 19. The rear wall 12 of the casting A is recessed on each side as indicated at 20 in Fig. 2 to accommodate the flanges 16 which may be said to straddle the wall 12. The ends of the plate 14 are also notched as indicated at 21 so as to provide cooperating stepped shoulders 118 and 119 engaged by the shoulders 18 and 19, as best indicated in Fig. 1.

The plate 15 is also provided with hollow, preferably integral forwardly extended thimbles 22—22 adapted to pass through corresponding openings 23—23 in the wall 12, the forward ends of said thimbles 22 pressing on the plate 14 as shown in Fig. 1. A centrally located lug is also preferably formed integral with the plate 15 as indicated at 24, it also passing through a suitable opening 25 in the back wall 12. It will be noted that the length of the flanges 16 and of the spacing thimbles 22 is made such that the two plates 14 and 15 will be held spaced apart a distance greater than the thickness of the wall 12, this excess corresponding to the desired amount of preliminary spring action. In ordinary practice this will approximate three-fourths of an inch. The two plates 14 and 15 may be held rigidly together to facilitate shipment, by means of the rivets 26—26 which are extended through the thimbles 22 and suitable openings in the plate 14.

As will be understood from the preceding description considered in connection with the drawings, during the first movement of the drawbar, as for instance, under buff, the entire casting and friction elements within the shell proper will move rearwardly without any appreciable action of the friction elements proper. The preliminary spring follower, comprised of the plates 14 and 15, will remain stationary against the rear stop lugs and hence the main springs B—B will be compressed during the preliminary action and until the wall 12 is prevented from further rearward movement by engagement with the plate 15. Thereafter, the friction elements will be moved relatively to the shell proper 10 against the resistance of the springs B. With this arrangement, it is evident that the preliminary spring action does not create any excessive stresses or even high stresses in the springs and furthermore the change from straight preliminary spring action to the friction action is more gradual than if a separate preliminary spring were employed.

Referring next to the construction illustrated in Figs. 5 to 8 inclusive, the combined friction shell and spring cage casting is designated at A', the spring resistance at B', the rear wall of the casting at 112, the friction-shoes at C', the wedge at D' and the retainer bolt at G'.

The arrangement of friction-shoes, wedge and anti-friction rollers is similar to that shown in Fig. 1 and need not be detailed. The type of friction gear shown in Figs. 5 to 8 inclusive, employs only one spring resistance B' so that the spring cage proper is in alinement with the friction shell proper, 110.

To obtain the preliminary spring action on the main spring resistance, two plates are employed 114 and 115 located on the inner and outer sides respectively of the end wall 112. The plate 114 is of rectangular outline as best indicated in Fig. 6, the same being insertable transversely of the casting A' through rectangular openings 50 in the opposite sides of the casting A'.

The plate 115 is of substantially circular outline with top and bottom enlargements as indicated at 51—51. Extended inwardly or forwardly from the enlargements 51 are flanges 116 which slide past or straddle the end wall 112, the latter being suitably cut away as indicated at 52—52 so as to leave the outer surface of the follower plate 115 flush with the casting A'. At its center, the plate 115 is formed with a hollow inwardly or forwardly extended thimble or boss 122, the same passing through a suitable opening 123 in the wall 112. As clearly shown in Fig. 5, said thimble or boss 122 bears on the plate 114 and the retainer bolt is anchored at one end within said hollow thimble 122 and at its other end in the wedge D', the shank of the bolt passing through suitable perforations in the plates 115 and 114. In this manner the parts are held in assembled relation and the spring B' may be placed under initial compression.

As clearly indicated in Fig. 5, the flanges 116 are of such length as to leave a space between the plates 114 and 115 of greater dimension than the thickness of the wall 112, the excess corresponding to the desired amount of preliminary spring action. In this arrangement also the casting A' is provided with shoulders 53—53 against which the plate 114 is adapted to engage at the end of the preliminary spring action, and simultaneously with the engagement of the wall 112 with the plate 115. In view of the detailed description of the operation of the mechanism shown in Fig. 1, a detailed description of the operation shown in Fig. 5 is not deemed necessary.

I have herein shown and described what I now consider the preferred manner of carrying out the invention, but the same is merely illustrative and I contemplate all changes and modifications that come within the scope of the claims appended hereto.

I claim:

1. In a device of the character described, the combination with a casting for a friction shock absorbing mechanism adapted to house a spring resistance and having a transverse wall at one end; of a preliminary spring follower associated with said casting comprising, a plate on the inner side of said wall, a plate on the outer side of said wall and spacing pressure-transmitting means between said plates arranged to hold them separated a distance greater than the effective thickness of said wall, said means including a pair of spaced abutment elements embracing said transverse wall.

2. In a device of the character described, the combination with a casting for a friction shock absorbing mechanism adapted to house a spring resistance and having a transverse wall at one end thereof; of a preliminary spring follower associated with said casting comprising a plate on the inner side of said wall, a plate on the outer side of said wall, a plurality of spacing elements between said plates, said elements including a plurality of abutments and a spacing thimble, said abutments being located on opposite sides of said thimble, said wall being apertured to accommodate said thimble, said thimble maintaining said plates at a distance apart greater than the effective thickness of said wall.

3. In a device of the character described, the combination with a casting for a friction shock absorbing mechanism having a friction shell proper at one end and a spring cage proper at the other end, said casting having a transverse wall at the spring cage end of the casting; of a plate on the inner side of said transverse wall and a plate on the outer side of said transverse wall, one of said plates having flanges at its ends extending therefrom toward the other plate, engaging with the latter and straddling said transverse wall, to maintain the two plates in spaced relation a distance greater than the effective thickness of said transverse wall of the casting.

4. In a friction shock absorbing mechanism of the character described, the combination with a casting having a friction shell proper at one end and a spring cage at the other end and provided with an integral transverse wall at the spring cage end of the casting; of friction elements cooperable with said shell proper; a spring resistance within the spring cage portion of the casting; a follower-plate interposed between said transverse wall of the casting and the adjacent end of the spring resistance; and a follower-plate on the outer side of said transverse wall, said outer plate having projections extended therefrom toward the plate on the inner side of said wall and engaging with the latter to maintain said two plates in spaced relation a distance greater than the effective thickness of said end wall.

5. In a device of the character described, the combination with a casting for a friction shock absorbing mechanism, adapted to house a spring resistance and having a continuous transverse end wall; of a preliminary spring follower associated with said casting comprising, a plate on the inner side of said wall, a plate on the outer side of said wall, and spacing pressure-transmitting means between said plates and extending through said continuous end wall, said means being adapted to hold said plates separated a distance greater than the effective thickness of said wall.

6. In a friction shock absorbing mechanism, the combination with a casting having a shell portion at one end and a spring cage at the other end; of a spring resistance within the spring cage portion of said casting; and a plurality of transversely arranged plates of approximately equal area, one of said plates being formed integral with the spring cage portion of said casting, the remaining plates co-acting with said spring resistance, said last named plates being held spaced apart a distance which is greater than the effective thickness of said first named plate, and one of said last named plates acting as a rear follower.

In witness that I claim the foregoing I have hereunto subscribed my name this 6th day of October, 1921.

JOHN F. O'CONNOR.

Witnesses:
   META SCHMIDT,
   ANN BAKER.